United States Patent Office 3,383,573
Patented May 14, 1968

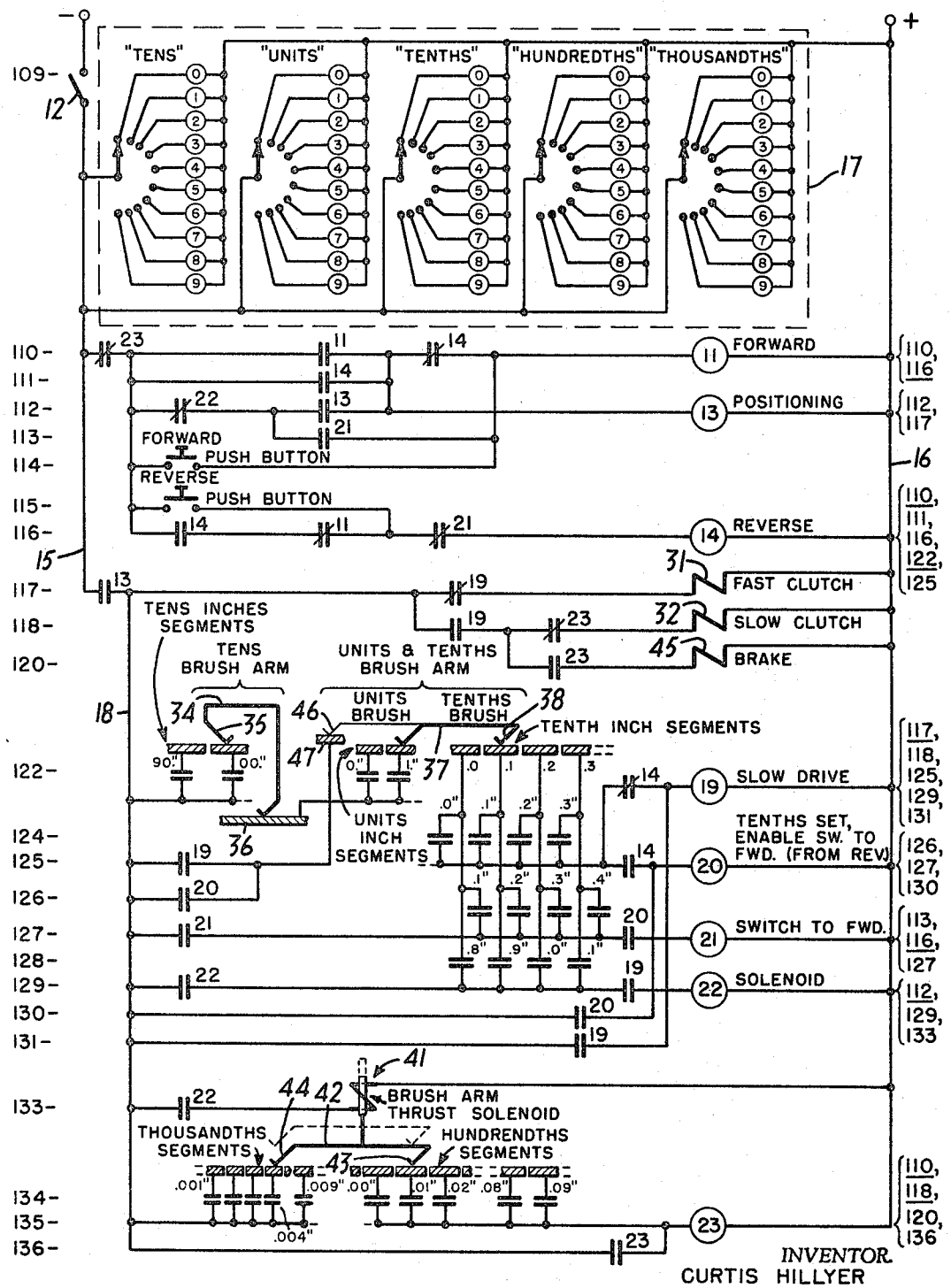

1

3,383,573
AUTOMATIC CONTROL POSITIONING MEANS INCLUDING MEANS FOR CHANGING SPEED
Curtis Hillyer, Short Hills, N.J., assignor to Hillyer Corporation, Mountainside, N.J., a corporation of Delaware
Filed Jan. 19, 1965, Ser. No. 426,498
7 Claims. (Cl. 318—18)

The present invention relates to positioning systems and apparatus and, more particularly, to novel and improved control apparatus for automatically effecting a high speed precision movement.

One form of numerical data control equipment as disclosed in my earlier U.S. Patent No. 2,853,900, granted Sept. 30, 1958, controls the movement of a controlled element to a predetermined position identified by data having a plurality of components in different denominational orders by a combination of data indicating means, positioning drive means, and position sensing means for controlling the operation of the positioning drive means. In that system, the data indicating means employs a plurality of positional data components of at least one major denominational order and one minor denominational order representative of the predetermined position, for example, a multiple digit number representative of one coordinate of movement of a machine table, saddle, or head slide mounted on precision guide ways. The positioning drive means for moving the controlled element to the predetermined position is operable at at least two different speeds, usually a high speed for rapid traverse and a low speed for final approach to the selected position, and may be operable in two different directions, e.g., forward and reverse.

Means are provided for changing the speed of movement from the relatively fast speed to the slow approach when the controlled element is substantially located at a position represented by the data components of the major denominational order and for stopping the movement of the controlled element when it is located at a position represented by both the major and minor denominational order data components. The position sensing means includes a plurality of major and minor denominational sensors, each including a plurality of incremental contact means representative of the different elements of the respective denominational order and a movable brush means adapted to selectively engage a selected one of the incremental contact means as a function of the position of the controlled element. The incremental contact means may be in the form of a conventional printed circuit, or arranged in any other suitable manner, and may be longitudinally disposed along a contact strip or radially or otherwise disposed about a disc or other surface.

The movable brush means of the major denominational orders are normally in operative engagement with their respective incremental contact means. However, as disclosed in my aforementioned patent, the movable brush means of the minor denominational sensor may be adapted in a variety of ways to be selectively brought into operative engagement with the respective incremental contact means of the minor denominational sensor.

In my prior system, in order to facilitate precision movement from any one coordinate position to another coordinate position irrespective of whether the second position required a substantially forward or reverse direction of movement, it was found to be desirable to have the rapid traverse take place in whichever direction was required, but the final approach take place in a single, e.g., forward, direction. Therefore, a precise and uniform stopping action is essentially guaranteed as the stop is always made in the same direction of movement and at the same speed. In the prior system, this was accomplished through the use of lead and lag brushes in the last major denominational order sensor. In order to obtain the intended action of the prior system, it was necessary to critically adjust and set the spacing of the lead and lag brushes. After the initial installation or adjustment, the spacing tends to change in a random manner as the brushes wear. Furthermore, the use of lead and lag brushes has been found to be a structural limitation affecting the design and layout of various forms of high speed sensors.

In accordance with the invention, there is provided a novel and improved system and apparatus utilizing control equipment requiring only a single brush means in contact with the incremental contact means of the last major denominational sensor, thereby simplifying the construction of the apparatus, making it more trouble free, and much more susceptible of constant and uniform precision control within a wide variety of sensor structural layouts and designs.

In an exemplary embodiment of the invention, a numerical data input unit supplies a numerical positioning command in the form of a five digit decimal dimensional number and a directional command. In its simplest form this input command can originate from the manual setting of a series of five decade switches comprising a data means for indicating positional data components, along with the actuation of a directional command pushbutton. The positional data indication and the directional command may, in accordance with well-known techniques, be derived from a punched paper tape or magnetic tape fed through a tape reader, the serial output of which may be translated from binary to decimal coding and distributed in the proper sequence. The position sensing means may be in the form of a numerical decimal encoder unit comprising a series of printed circuit commutator disks having pluralities of incremental contact means representative of the different elements of the respective denominational orders of the positional or dimensional data information. For example, three commutator disks may be used, two of which may each provide two decades of segments, and a third of which will provide a single decade, each representative of different components of the five digit decimal dimensional or positional number. The double decade disks may be arranged with ten major segments representative of the different elements of the respective denominational order along with ten small divisional segments positioned along the extent of each major segment and connected to repeat throughout each of the major segments, the small divisions being representative of the different elements of the next lower denominational order.

In accordance with the invention, selectively energizable first control means are used to effect the change in speed of movement from the fast traverse to the slow speed when the lowest major denominational sensor brush means engages a selectively enabled first one of the major denominational incremental contact means at the time that the controlled element is substantially located at a position represented by the data components of the major denominational orders. The incrmental contact means is selectively enabled by the operation of the positional data indicating means. The speed of movement of the positioning drive means is then changed from the relatively fast traverse speed to the relatively slow positioning speed. The brush means of the lowest major denominational sensor continues to move across and eggage different successive incremental contact means of the lowest major denominational order while the speed change is taking place.

A second control means for effecting the operative engagement of the movable brush means and contact means of the minor denominational sensor is then operated when the major denominational sensor brush means engages a selectively enabled second one of the major denominational incremental contact means, which has been selected in response to the operation of the data indicating means.

If the next position to which the controlled element is to be moved is identified by data of lower numerical value, for example, the controlled element will first be moved in a reverse direction at the first traverse speed until a third control means is selectively energized when the major denominational sensor brush means engages one of the major denominational incremental contact means indicating that the controlled element is substantially located at a position represented by the data components of the major denominational orders. At that time or shortly thereafter, the positioning drive means is reversed in its direction of movement and the major denominational sensor brush traveling in the forward direction engages the previously mentioned first one of the major denominational incremental contact means to effect the requisite change in speed of movement from fast to slow speed. The brush means then continues to move across the incremental contact means at the slow speed until it energizes the second control means for effecting the operative engagement of the movable brush means and contact means of the minor denominational sensor.

For a more complete understanding of the invention, reference may be had to the following detailed description taken in conjunction with the accompanying single figure of the drawing, which is an electrical schematic diagram of an exemplary embodiment of the control circuit and apparatus of the invention.

In order to simplify the description of the exemplary embodiment of the invention, details of the controlled element, positioning motors, the usual limit switches and interlocking controls with the machine cycle of the controlled element have been omitted. Further, the schematic diagram includes only one coordinate of movement, whereas it will be understood by those skilled in the art that a similar concurrent or consecutive control of a second and even a third coordinate of movement may be effected by the suitable duplication of parts of the disclosed system, although a common power source may be utilized and the final output controls may be combined in any suitable fashion.

If it is desired to move the controlled element forward, the forward push button (line 114) would be momentarily closed to energize the FORWARD relay 11 (line 110), assuming the machine ready switch 12 (line 109) had been previously closed to connect the control system to a suitable power source and to energize the electrical busses 15 and 16. When the relay 11 is energized, it seals itself in by closing a normally open contact 11 (line 110). When the contact 11 is closed it also effects the energization of POSITIONING relay 13 (line 112) by connecting it across the busses 15 and 16. The relay 13 seals itself in by closing normally open contact 13 (line 112) and enables the position sensing means and respective control circuits for controlling the speed of operation of the positioning drive means and for stopping the operation of the positioning drive means and the movement of the controlled element by closing normally open contact 13 (line 117).

When the forward relay 11 (line 110) is energized the positioning motor (not shown), which may take any suitable conventional form, is started into operation to move the controlled element (not shown) to a predetermined position selected by the data means 17 (line 109) at the relatively fast traverse speed determined by the energization of a fast clutch means 31 through the now closed contact 13 and the normally closed contact 19 (line 117).

The data means 17 in the exemplary embodiment comprises a plurality of banks of data storage relays of five different denominational orders, viz "tens," "units," "tenths," "hundredths" and "thousandths" with conventional decade selector switches. Each of the data storage relays of the data means 17 have respective contacts in the position sensing means control circuits as shown in part in lines 122 through 128 and line 134 to control the slowdown and stopping of the movement of the controlled element. In the case of tape operation, for example, the storage relays of the data means 17 may be actuated in a conventional manner from suitable tape inputs instead of the manually operated decade switches.

If it is desired to start the system in the reverse direction, the reverse push button (line 115) is momentarily depressed to energize the REVERSE relay 14 (line 116), which seals itself in by closing the normally closed contact 14 to complete a circuit through normally closed contact 11 and the normally closed contact 21 (line 116). Energization of the relay 14 opens the normally closed contact 14 (line 110) dropping out the FORWARD relay 11, if it had been previously energized, and insuring that the normally closed contact 11 (line 116) is closed. The relay 14, when energized, also closes the normally open contact 14 (line 111) to pick up and maintain operative the POSITIONING relay 13 (line 112). The REVERSE relay 14 also operates in a conventional manner to start up the positioning motor and operate it in the reverse direction, the speed of operation being dependent upon whether the fast clutch means 31 (line 117) or a slow clutch means 32 (line 118) is operating.

With the controlled element now in motion under the control of the positioning drive means, for example, in the forward direction, the control sequences involved in stopping the controlled element at a predetermined position shall now be considered. As disclosed, for example, in my Patent No. 2,853,900, the controlled element and the position sensing means for the major denominational orders may be driven by a lead screw (not shown) operated by the positioning drive means. Assuming that the desired predetermined position is represented by a five digit number, 01.114", the data means 17 is either manually or automatically set in its respective storage relays to indicate the positional data components of each of the denominational orders. Each of these different denominational orders have corresponding incremental contact means or segments in the position sensing means which are representative of the different elements (0 through 9) of the respective denominational orders. For example in line 122, there is shown the 00." and 90." segments of the "tens" inches segments connected through respective 90." and 00." normally open contacts of the "tens" storage relays of data means 17 to conductor 18, which in turn is connected through contact 13 (line 117) to the energized electrical bus 15. A conventional brush arm 34 including movable brush means 35 adapted to engage one of the incremental contact means of the "tens" inches segments as a function of the position of the controlled element is connected by suitable slip ring means 36 to the "units" inch segments (line 122) constituting the incremental contact means of the units denominational order through normally open contacts of the storage relays of data means 17. "Units" and "tenths" brush arm 37, which moves relative to the "units" inch segments and "tenth" inch segments (line 122) of the position sensing means as a function of the position of the controlled element is adapted to engage through its brush means 38 different ones of the "tenth" inch segments constituting the lowest major denominational order.

With the system moving in the forward direction, i.e., to the right of the drawing, the "units" and "tenths" brush arm 37 and the "tens" brush arm 34 are sweeping over the respective incremental contact segments of the different major denominational orders. When all brush means of the respective major denominational sensors arrive simultaneously at the combination of selected incremental contact means, selected by the activated storage relays of the data means 17, a continuous circuit is established to energize the SLOW DRIVE relay 19 from the bus 15 through the now closed contact 13, the denominational sensor including the respective selected incremental contacts and brush means (in this case 01.1" as shown in the drawing), contact .1" (line 124) and normally closed contact 14 (line 122), which is closed because the positioning drive means is operating in the forward direction.

The SLOW DRIVE relay 19, which constitutes a selectively energizable control means, seals itself in and is maintained energized by closing normally opened contact 19 (line 131). Relay 19 also opens the normally closed contact 19 (line 117) deactivating the fast clutch means 31 and at the same time closes normally open contact 19 (line 118) to activate the slow clutch means 32, thereby causing the positioning drive means to change the speed of movement of the controlled element from the relatively fast traverse speed to a slow positioning speed since the controlled element is now substantially located at a position represented by the data components of the major denominational orders. A further normally open contact 19 (line 129) is closed in the energizing circuit of the SOLENOID relay 22 to partially enable that circuit.

With the relay 19 energized and sealed in, the "tenths" brush 38 continues to move in the forward direction until it makes contact with the .3" segment which is two segments beyond the previously engaged .1" segment. The .3" segment is connected through the normally open .1" contact (line 128), which was previously closed by its respective storage relay in the data means 17. Therefore, the SOLENOID relay 22 is energized and seals itself in by closing its normally open contact 22 (line 129).

When the SOLENOID relay 22 is energized, it closes the normally open contact 22 (line 133) to complete the energizing circuit for the brush arm thrust solenoid means 41 (line 133), which operates to bring a brush arm 42 and its associated movable brush means 43 and 44 for the "hundredths" and "thousandths" denominational orders, respectively, into engagement with their respective incremental contact means or segments. When the brush means 43 and 44 are in engagement with the selectively enabled segments in their respective orders, as determined by the storage relays of the data means 17 and the position of the controlled element or its drive means, a relay 23 (line 135) is energized and seals itself in by closing its normally open contact 23 (line 136). The relay 23 then functions to stop the operation of the positioning drive means and the movement of the controlled element by opening its normally closed contact 23 (line 118) to disable the slow clutch means 32 and setting the brake on the drive means by energizing the brake coil 45 by closing its normally open contact 23 (line 120). Thus the positioning motion of the controlled element is stopped at the predetermined position indicated by the data means 17. In practice, a consistent overtravel occurs, which remains constant under all conditions, and is taken into account in the initial adjustment of the system.

The relay 23 also functions to set at rest the system by opening a normally closed contact 23 (line 110) to drop out the relays 11, 13 and 14. When the POSITIONING relay 13 drops out, its contact 13 (line 117) is restored to its normally open condition, thereby deenergizing the position sensing circuits. Contacts (not shown) for the relay 23 may be used in a suitable manner to provide a signal that the controlled element has been moved to the predetermined position, so as to enable the next step to be performed in the overall system control cycle. When the controlled equipment has completed its cycle of operation, the switch 12 (line 109) may be opened to release the entire system.

While the above description relates to operation of the system in the forward direction, certain portions of the description are equally relavent to operation in the reverse direction as will be evident from the following description.

Assuming that the positioning drive means is operating in the reverse direction with the relay 14 energized and the drive means operating at fast traversed speed, the normally closed contact 14 (line 122) will be open to prevent energization of the SLOW DRIVE relay 19 under reverse drive conditions. At the same time, the normally open contact 14 (line 125) is closed so that when the "tenths" brush 38 passes over and engages the .1" segment, while moving to the left in the drawing, a relay 20 forming a part of a reversing control means is energized. The relay 20 seals itself in by closing its contact 20 (line 130). However, no charge is made at that point in the control circuits for the positioning drive means and the controlled element continues to be moved at fast traverse speed in the reverse direction. On the other hand, the relay 20 closes a normally open contact 20 (line 127) to partially enable a relay 21 constituting a control device in the reversing control means for the system which is connected to a "tenths" inch segment of lesser value than the "tenths" inch segment representative of the intended predetermined position by the closing of a .1" normally open contact (line 126) under the control of the storage relays in the data means 17. In the disclosed embodiment, the segment of lesser value is the .0" segment. When the brush means 38, during its continued travel the reverse direction reaches the .0" segment, the relay 21 is energized and drops out the REVERSE relay 14 (line 116) by opening its normally closed contact 21, and initiates forward drive and movement of the controlled element by energizing the FORWARD relay 11 through the closure of its normally closed contact 21 (line 113). The relay 21 also seals itself in by closing its normally open contact 21 (line 127).

The controlled element under the control of the positioning drive means then travels in the forward direction at rapid traverse speed until the "tenths" brush 38 again contacts the .1" segment. At that time, the energizing circuit of the SLOW DRIVE relay 19 is now completed because the normally closed contact 14 (line 122) was restored to its normally closed condition upon the reversal of movement and the dropping out of its relay 14. The system then decreases its speed of movement and is brought to a stop at the predetermined position in the manner previously described for forward movement.

In order to eliminate the necessity of maintaining coincidence circuits through the "units" and "tens" segments, the "unit" and "tenths" brush arm 37 has an additional brush means 46 adapted to engage a slip ring 47 and establish contact with the conductor 18 through either of the normally open contacts 19 and 20 (lines 125 and 126), which are closed when the respective relays are energized. This prevents any interruption of the control functions due to the continued movement of the "tens" brush after the initial actuation of either of the relays 19 or 20.

Thus there has been provided in accordance with the invention a novel, improved and simplified structural arrangement of a positioning sensing means in a positioning control system for controlling the movement of a controlled element to a predetermined position identified by data having a plurality of components in different denominational orders.

It will be understood by those skilled in the art that the above described detailed embodiment is merely exemplary and that it is susceptible of modification and variation without departing from the spirit and scope of the invention. Therefore, the invention is not deemed to be limited except as defined by the appended claims.

I claim:

1. In apparatus for controlling the movement of a controlled element to a predetermined position identified by data having a plurality of components in different denominational orders including data means for indicating positional data components of at least one major denominational order and one minor denominational order representative of the predetermined position, positioning drive means for moving the controlled element to the predetermined position operable at at least two different speeds and having means for changing the speed of movement from a relatively fast speed to a slow speed when the controlled element is substantially located at a position represented by the data component of major denominational order and for stopping the movement of the controlled element when it is located at a position represented by both the major and minor denominational order data components, and position sensing means having major and minor denominational sensors each including a plurality of incremental contact means representative of the different elements of the respective denominational orders and a movable brush means adapted to selectively engage a selected one of the incremental contact means as a function of the position of the controlled element, the movable brush means of the minor denominational sensor being adapted to be selectively brought into operative engagement with the respective incremental contact means of the minor denominational sensor when the controlled element is substantially located at a position represented by the data component of the major denominational order, the position sensing means comprising selectively energizable first control means for effecting the change in speed of movement from fast to slow speed when the major denominational sensor brush means engages a selectively enabled first one of the major denominational incremental contact means, means responsive to the data indicating means for selectively enabling said first one of the incremental contact means, selectively energizable second control means for effecting the operative engagement of the movable brush means and contact means of the minor denominational sensor when the major denominational sensor brush means engages a selectively enabled second one of the major denominational incremental contact means, and means responsive to the data indicating means for selecting said second one of the incremental contact means.

2. Apparatus as claimed in claim 1, wherein said second one of the major denominational incremental contact means is representative of a higher increment within the major denominational order than said first one.

3. In apparatus for controlling the movement of a controlled element to a predetermined position identified by data having a plurality of components in different denominational orders including data means for indicating positional data components of at least one major denominational order and one minor denominational order representative of the predetermined position, positioning drive means for moving the controlled element to the predetermined position operable at at least two different speeds and in two different directions and having means for determining the direction of movement and for changing the speed of movement from a relatively fast speed to a slow speed when the controlled element is substantially located at a position represented by the data component of major denominational order and for stopping the movement of the controlled element when it is located at a position represented by both the major and minor denominational order data components, and positioning sensing means having major and minor denominational sensors each including a plurality of incremental contact means representative of the elements of the respective denominational order and a movable brush means adapted to selectively engage a selected one of the incremental contact means as a function of the position of the controlled element, the movable brush means of the minor denominational sensor being adapted to be selectively brought into operative engagement with the respective incremental contact means of the minor denominational sensor when the controlled element is substantially located at a position represented by the data component of the major denominational order, the position sensing means comprising energizable first control means for effecting as the positioning drive means is operating in a first one of the two different directions the change in speed of movement from fast to slow speed when the major denominational sensor brush means engages a selectively enabled first one of the major denominational incremental contact means, means responsive to the data indicating means for selectively enabling said first one of the incremental contact means, selectively energizable second control means for effecting the operative engagement of the movable brush means and contact means of the minor denominational sensor when the major denominational sensor brush means engages a selectively enabled second one of the major denominational incremental contact means, means responsive to the data indicating means for selecting said second one of the incremental contact means, and selectively energizable third control means for effecting as the positioning drive means is operating in the opposite one of the two different directions the reversal of movement of the controlled element when the major denominational sensor brush means engages a selectively enabled one of the major denominational incremental contact means.

4. In apparatus as claimed in claim 3, wherein said third control means comprises a first selectively energizable control device operable for effecting the change in direction of movement from said opposite direction to said first direction when the major denominational sensor brush means engages a selectively enabled third one of the major denominational incremental contact means, means responsive to the data indicating means for selectively enabling said third one of the incremental contact means, said selectively energizable first control device being disabled until the major denominational movable brush means has engaged said third one of the major denominational incremental contact means, and selectively energizable second control device for enabling the energization of said first control device when the major denominational sensor brush means engages said first selectively enabled one of the major denominational incremental contact means.

5. Apparatus as claimed in claim 4, wherein said third one of the major denominational incremental contact means is representative of a lesser increment within the major denominational order than said first one and said second one of the major denominational incremental contact means is representative of a higher increment within the major denominational order than said first one.

6. Apparatus as claimed in claim 5, comprising means for preventing the energization of said first control means when the direction of movement is in said opposite direction, and means for preventing the energization of said third control means when the direction of movement is in said first of the two different directions.

7. Apparatus as claimed in claim 6, comprising means for maintaining said first, second and third control means energized.

References Cited

UNITED STATES PATENTS

| | | | |
|---|---|---|---|
| 2,853,900 | 9/1958 | Hillyer | 74—821 |
| 3,091,755 | 5/1963 | Sanner et al. | |

BENJAMIN DOBECK, *Primary Examiner.*